(12) United States Patent
Santillan Gutierrez et al.

(10) Patent No.: US 10,519,992 B2
(45) Date of Patent: Dec. 31, 2019

(54) SPRING CLIP WITH A SINGLE RESILIENT CANTILEVERED LEG

(71) Applicant: FORD GLOBAL TECHNOLOGIES, LLC, Dearborn, MI (US)

(72) Inventors: Diego Santillan Gutierrez, Tizayuca (MX); Fernando Paisano Rodriguez, San Andres Cholula (MX); Izcoatl Herrera, Azcapotzalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/827,012

(22) Filed: Nov. 30, 2017

(65) Prior Publication Data

US 2019/0162215 A1 May 30, 2019

(51) Int. Cl.
*F16B 2/22* (2006.01)
*B60R 13/00* (2006.01)

(52) U.S. Cl.
CPC ............... *F16B 2/22* (2013.01); *B60R 13/00* (2013.01)

(58) Field of Classification Search
CPC .......... F16B 2/22; F16B 21/086; B60R 13/00; H01L 23/4093; Y10T 24/309; Y10T 24/44026; Y10T 24/307; Y10T 24/44752
See application file for complete search history.

(56) References Cited

U.S. PATENT DOCUMENTS

| 4,440,374 | A | * | 4/1984 | Achille | F16B 2/22 248/544 |
|---|---|---|---|---|---|
| 4,708,895 | A | * | 11/1987 | Mizusawa | F16B 5/126 24/289 |
| 4,860,402 | A | | 8/1989 | Dichtel | |
| 5,507,545 | A | * | 4/1996 | Krysiak | B60J 3/023 24/453 |
| 5,597,280 | A | * | 1/1997 | Stern | F16B 2/08 24/453 |
| 5,662,375 | A | | 9/1997 | Adams et al. | |
| 5,707,192 | A | | 1/1998 | Vortriede et al. | |
| 5,956,821 | A | * | 9/1999 | Kurek, III | E05C 1/10 24/458 |
| 5,987,714 | A | * | 11/1999 | Smith | F16B 5/0614 24/289 |
| 6,568,045 | B2 | * | 5/2003 | Smith | F16B 5/0614 24/295 |
| 8,056,193 | B2 | | 11/2011 | Park | |

(Continued)

FOREIGN PATENT DOCUMENTS

| CN | 201430383 Y | 3/2010 |
|---|---|---|
| CN | 203189436 U | 9/2013 |
| CN | 203832387 U | 9/2014 |

OTHER PUBLICATIONS

English Machine Translation of CN201430383Y.
English Machine Translation of CN203189436U.
English Machine Translation of CN203832387U.

*Primary Examiner* — Robert Sandy
*Assistant Examiner* — Rowland Do
(74) *Attorney, Agent, or Firm* — Vichit Chea; King & Schickli, PLLC

(57) ABSTRACT

A spring clip includes a base, a post carried on the base and a single resilient cantilevered leg depending from the post. That resilient cantilevered leg includes an S-curve segment and a distal end having a double blocked notch.

12 Claims, 5 Drawing Sheets

(56) References Cited

U.S. PATENT DOCUMENTS

| | | | |
|---|---|---|---|
| 8,130,498 B2* | 3/2012 | Wirnitzer | H01L 23/40 165/104.33 |
| 9,121,426 B2* | 9/2015 | Jagoda | F16B 5/0657 |
| 2003/0015882 A1 | 1/2003 | Nagae et al. | |
| 2011/0097137 A1* | 4/2011 | Spitz | F16B 2/243 403/33 |
| 2013/0011188 A1* | 1/2013 | Donnelly | F16B 21/086 403/291 |
| 2018/0128299 A1* | 5/2018 | Katabira | F16B 37/0857 |

* cited by examiner

SPRING CLIP WITH A SINGLE RESILIENT CANTILEVERED LEG

TECHNICAL FIELD

This document relates generally to the fastener field and, more particularly, to a new and improved V-shaped spring clip incorporating a post and a single resilient cantilevered leg depending from that post.

BACKGROUND

Various types of fasteners including, for example, bolts/nuts, metal clips, plastic clips or the like may be utilized to secure a plastic part to a substrate such as a sheet metal part. Significantly, every added fastener increases the part cost and weight of the assembly. More specifically, fastener usage requires additional operations at the assembly plant or at the plastic part manufacturer and every additional operation increases the required man power, process cost and production time. In addition, each fastener has a risk of producing squeaks and rattles. Further, added, separate fasteners have the risk of being missing or mismatched during assembly.

This document relates to a new and improved spring clip having a post and a single resilient cantilevered leg depending from that post. The spring clip has an effective V-shape. The spring clip eliminates the need for additional, separate fasteners thereby reducing the weight and cost of the assembly. It also provides a robust and stronger, more durable joint clamping between a plastic part and a sheet metal part while maintaining proper position and alignment through assembly and vehicle operation and substantially eliminating the risk of squeaks and rattles.

The spring clip also includes a double blocked notch on the end of the single resilient cantilevered leg to dissipate stress concentrations. Further, the spring clip has a low insertion effort and functions to locate, lock and retain parts together in a single snapping action.

SUMMARY

In accordance with the purposes and benefits described herein, a new and improved spring clip is provided. That spring clip comprises a base, a post carried on the base and a single resilient cantilevered leg depending from the post.

The spring clip may further include at least one guide rib carried on the post opposite the single resilient cantilevered leg. That at least one guide rib may be tapered. Thus, the at least one guide rib may have a first width $W_1$ at a first end and a second width $W_2$ at a second end wherein $W_1 > W_2$. The first end may also engage the base.

The single resilient cantilevered leg may include an S-curve segment. The single resilient cantilevered leg may also include a distal end having a double blocked notch. The double blocked notch may include a midpoint angle and a radiused face. Further, the double blocked notch may be substantially V-shaped.

The post may include an undercut. The post may include at least one aperture extending through the post. In one or more of the many possible embodiments, the S-curve segment may have a first end connected to the post and a second end connected to the double-blocked notch.

In accordance with an additional aspect, a spring clip is provided. That spring clip consists essentially of a post and a single resilient cantilevered leg depending from that post.

At least one tapered guide rib may be carried on the post opposite the single cantilevered leg.

The single resilient cantilevered leg may include an S-curve segment and/or a double blocked notch. The S-curve segment may have a first end connected to the post and a second end connected to the double blocked notch. The double blocked notch may include a midpoint angle and a radiused face. Further, the double blocked notch may be substantially V-shaped.

In the following description, there are shown and described several preferred embodiments of the spring clip. As it should be realized, the spring clip is capable of other, different embodiments and its several details are capable of modification in various, obvious aspects all without departing from the spring clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spring clip and together with the description serve to explain certain principles thereof.

Figure 3A:
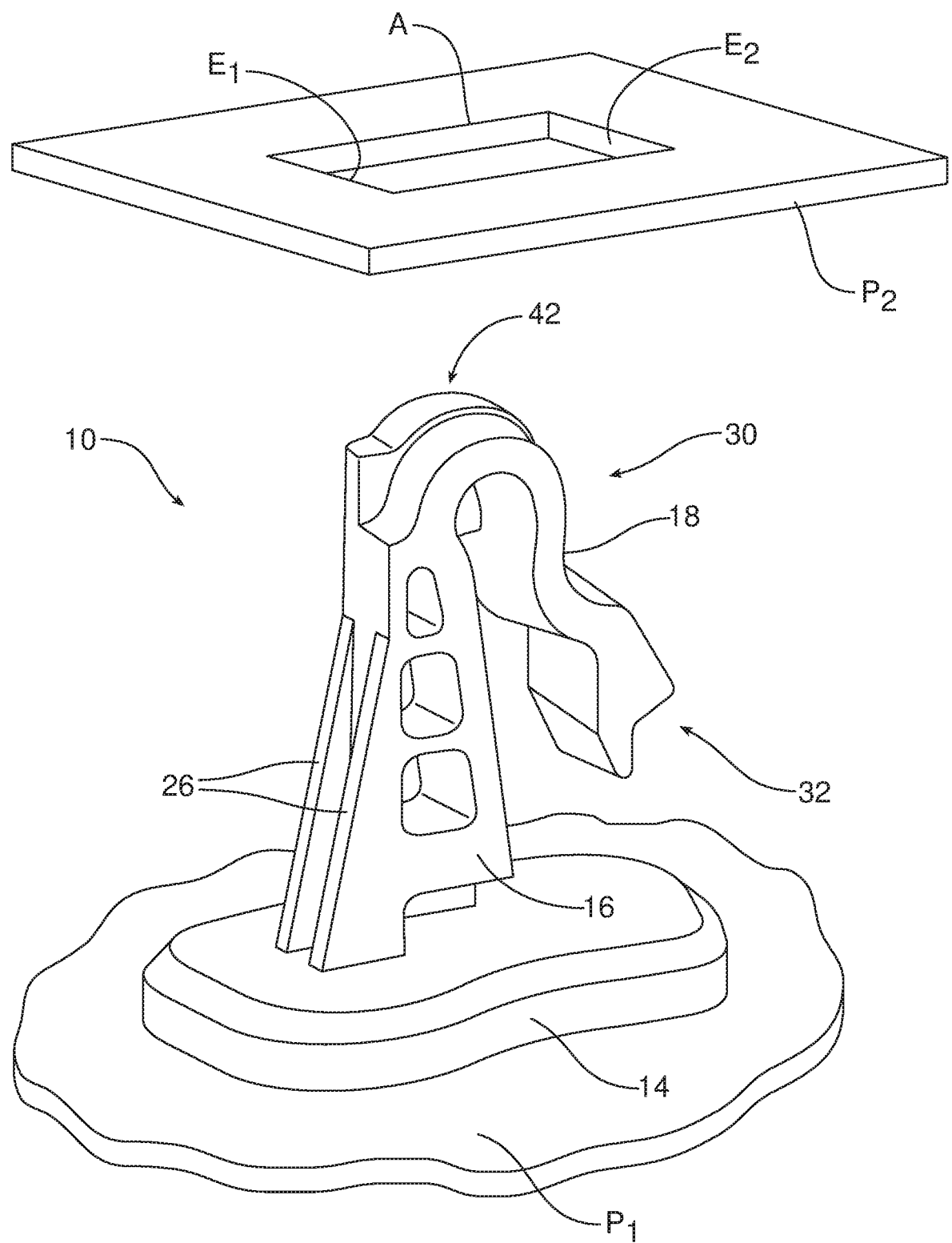
FIGS. 3a-3c are a series of views that illustrate how a plastic part or component is secured to a sheet metal workpiece utilizing the spring clip of FIG. 1.

More specifically, FIG. 3a is a perspective view illustrating how the spring clip on the plastic part is aligned with a mounting aperture in a workpiece.

Figure 3B:
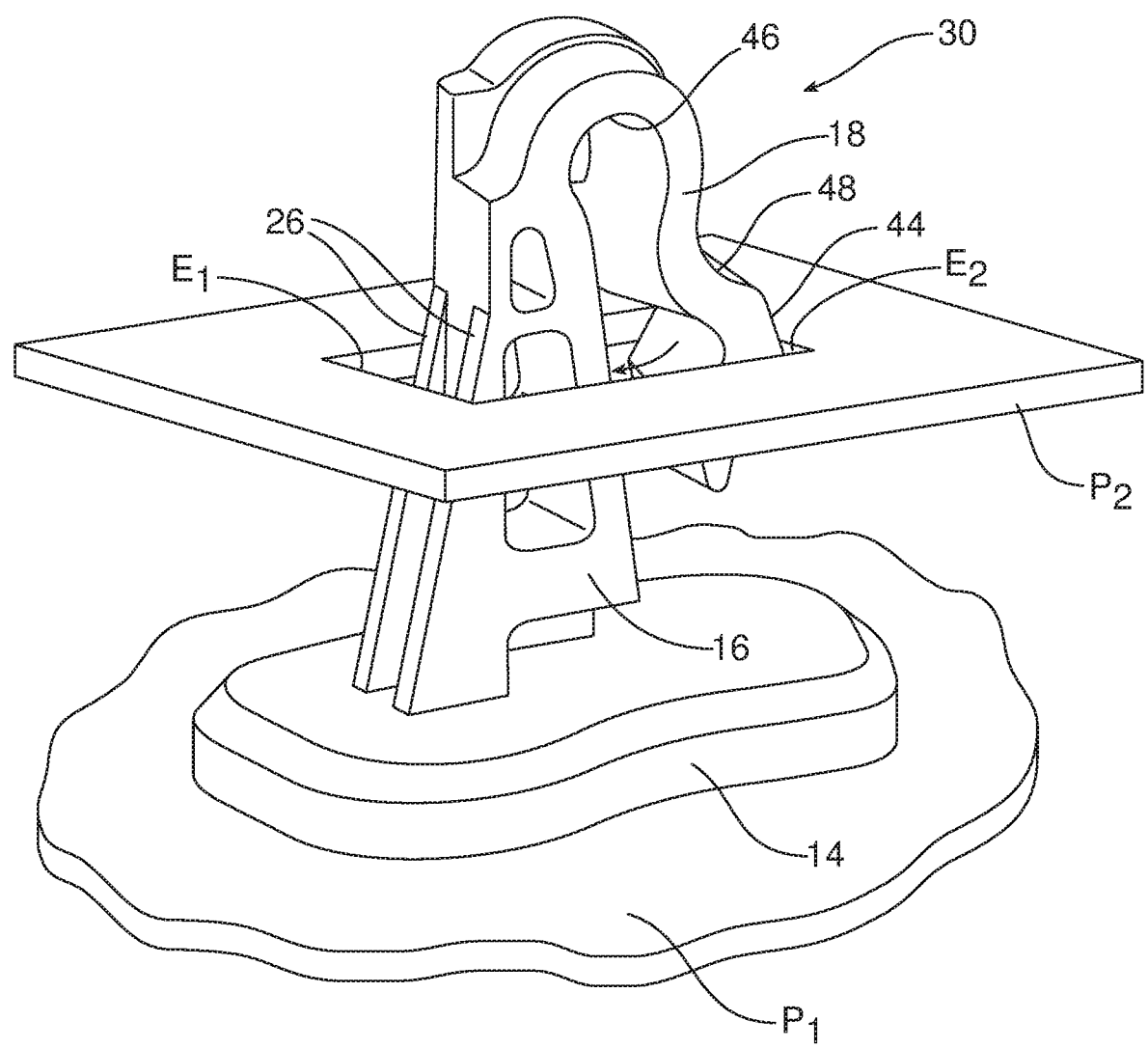

FIG. 3b is a perspective view illustrating the inward deflection of the single resilient cantilevered leg as the spring clip is inserted into the mounting aperture.

Figure 3C:
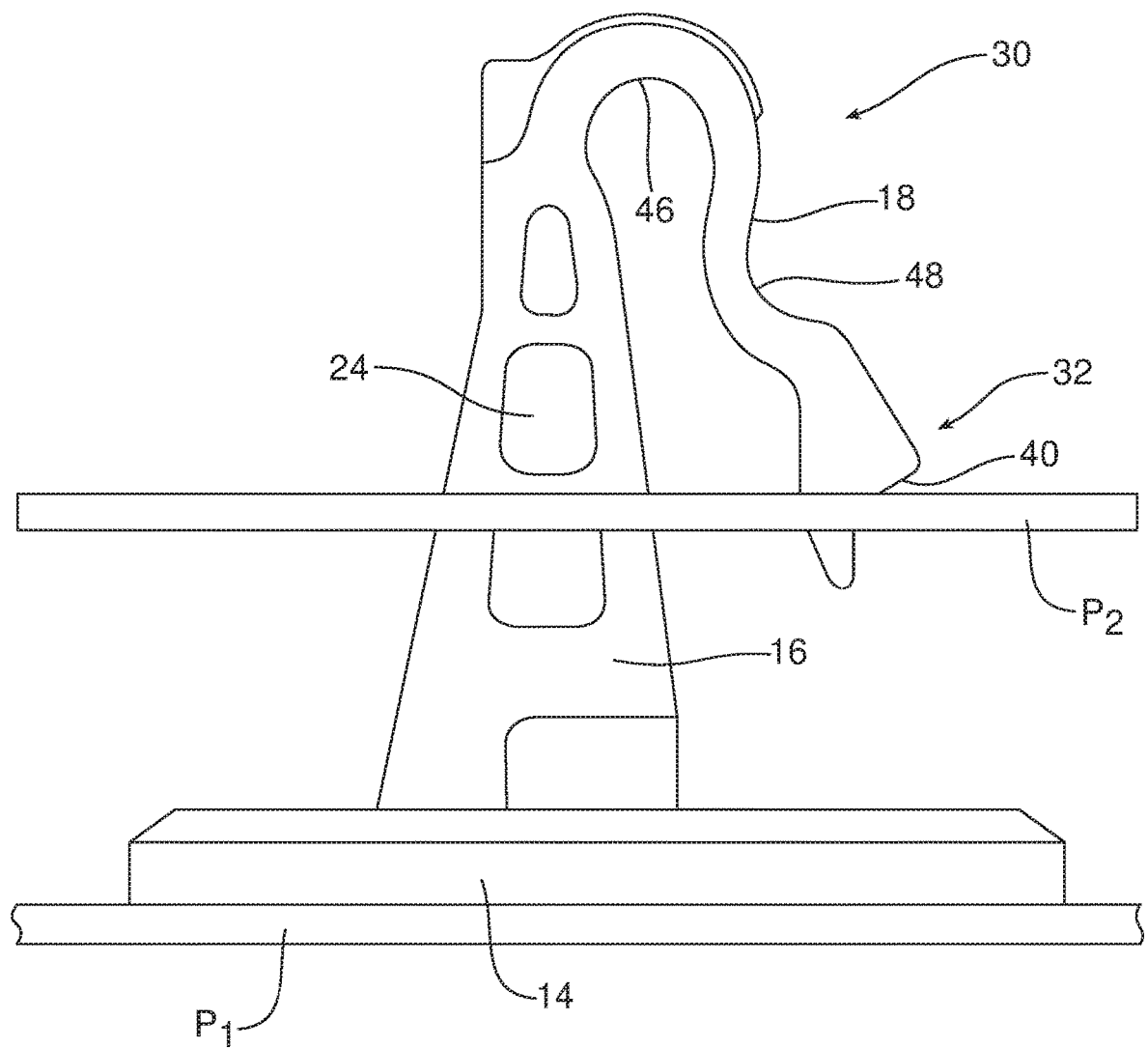

FIG. 3c is a side elevational view of the spring clip once the connection has been completed.

Reference will now be made in detail to the present preferred embodiments of the spring clip, examples of which are illustrated in the accompanying drawing figures.

DETAILED DESCRIPTION

Reference is now made to FIGS. 1, 2 and 3a-3c illustrating the new and improved spring clip 10. That spring clip 10 includes a body 12 having a base 14 and a post 16 carried on the base. A single resilient cantilever leg 18 is carried on or depends from the post 16.

The entire body 12 may be molded as a single unitary piece from an appropriate plastic or composite material providing the single resilient cantilevered leg 18 with the desired resilience to properly operate as a fastener. The base 14 may comprise a distinct structure that may be molded with or otherwise fastened to a component part such as a plastic component part or the base 14 may be integrally formed as a part of the plastic part that is to be connected by means of the spring clip 10 to another structure such as a sheet metal component in a manner that will be describe in greater detail below.

In the illustrated embodiment, the post 16 includes an undercut 20 immediately adjacent the base 14. This reduces the cross sectional area of the post 16 where it joins the base 14 and thus functions to reduce the potential for sink marks in the bottom face 22 of the base 14. This is significant where the base 14 is an integral part of the plastic component and the bottom face 22 is a class A surface that is exposed to view.

The post 16 may also include at least one aperture 24 extending through the post 16. In the illustrated embodiment, three apertures 24 are shown. The apertures 24 reduce the cross sectional area of the post 16 and allow the material from which the post 16 is molded to rapidly set and cool without significant shape, orientation and dimensional distortion.

At least one guide rib 26 is carried on the post 16 on the side of the post opposite the single resilient cantilevered leg 18. More particularly, in the illustrated embodiment, two guide ribs 26 are provided. Those guide ribs 26 are spaced apart so as to define an intervening channel 28. As should be appreciated, the guide ribs 26 are tapered from bottom to top. Thus, each guide rib 26 has a first width $W_1$ at a first end, engaging the base 14, and a second width $W_2$ at a second end oriented toward the top of the post 16. The widths $W_1$ and $W_2$ correspond to the height of the ribs 26 with respect to the post 16. The function of the tapered guide ribs 26 will be described in greater detail below.

The single resilient cantilever leg 18 includes an S-curve segment 30 and a double blocked notch 32 at the distal end of the single resilient cantilever leg 18. More specifically, the S-curve segment 30 has a first end 34 connected to the post 16 and a second end 36 connected to the double blocked notch 32.

The double blocked notch 32 includes a midpoint angle 38 and a radiused face 40. In the illustrated embodiment, the double blocked notch 32 is substantially V-shaped.

Advantageously, the S-curve segment 30 distributes stress over a larger area and functions to dissipate any stress concentration in the single resilient cantilevered leg 18. The double blocked notch 32 and, more particularly, the radiused face 40 of the double blocked notch, serves to reduce stress on the spring clip 10 and, more particularly, the single resilient cantilevered leg 18 when one attempts to release the spring clip in order to disconnect the component parts held together by the spring clip for maintenance or any other purpose.

Figure 1:
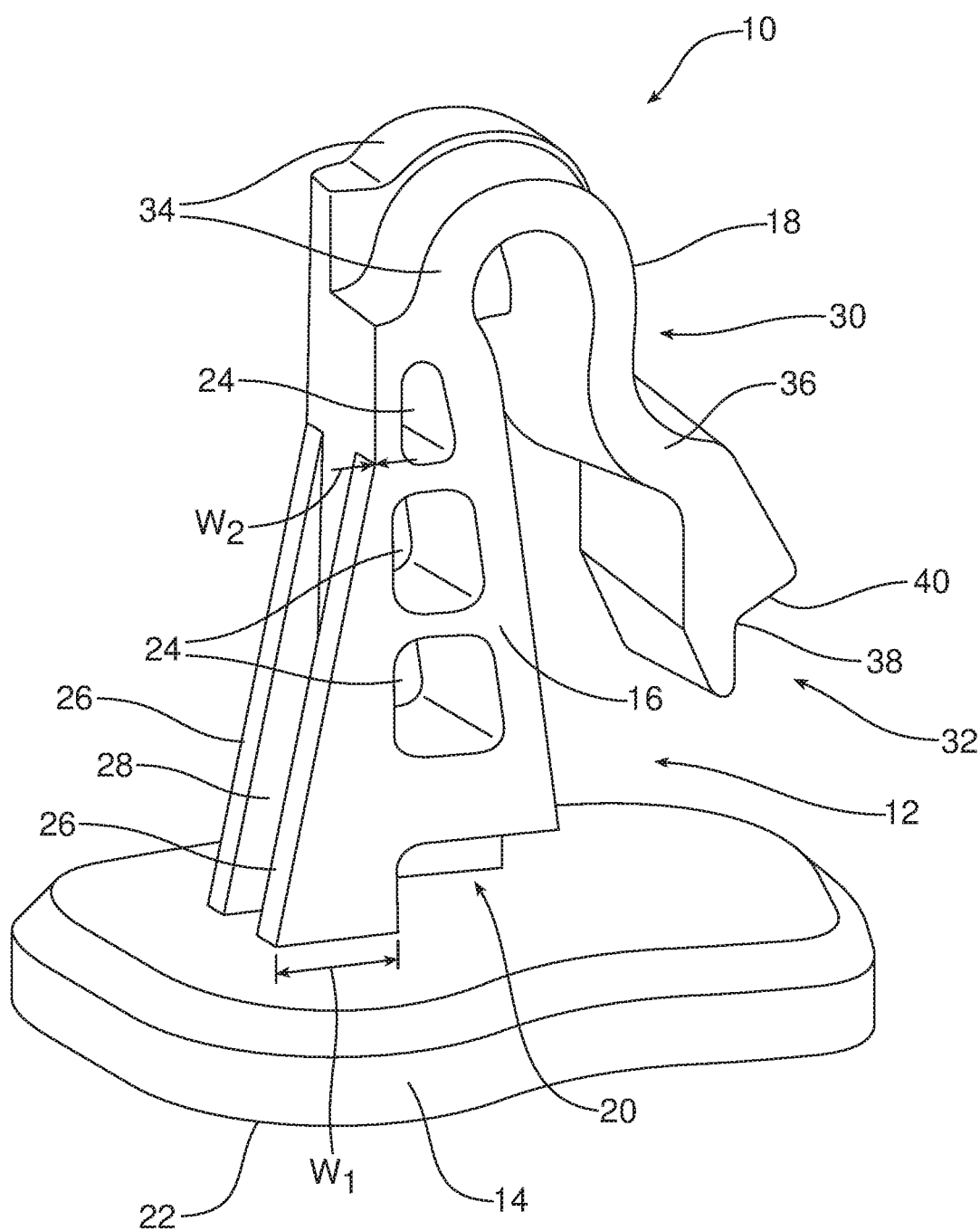
FIG. 1 is a perspective view of the spring clip including a base, a support connected to the base and a single resilient cantilevered leg depending from the post.
Figure 2:
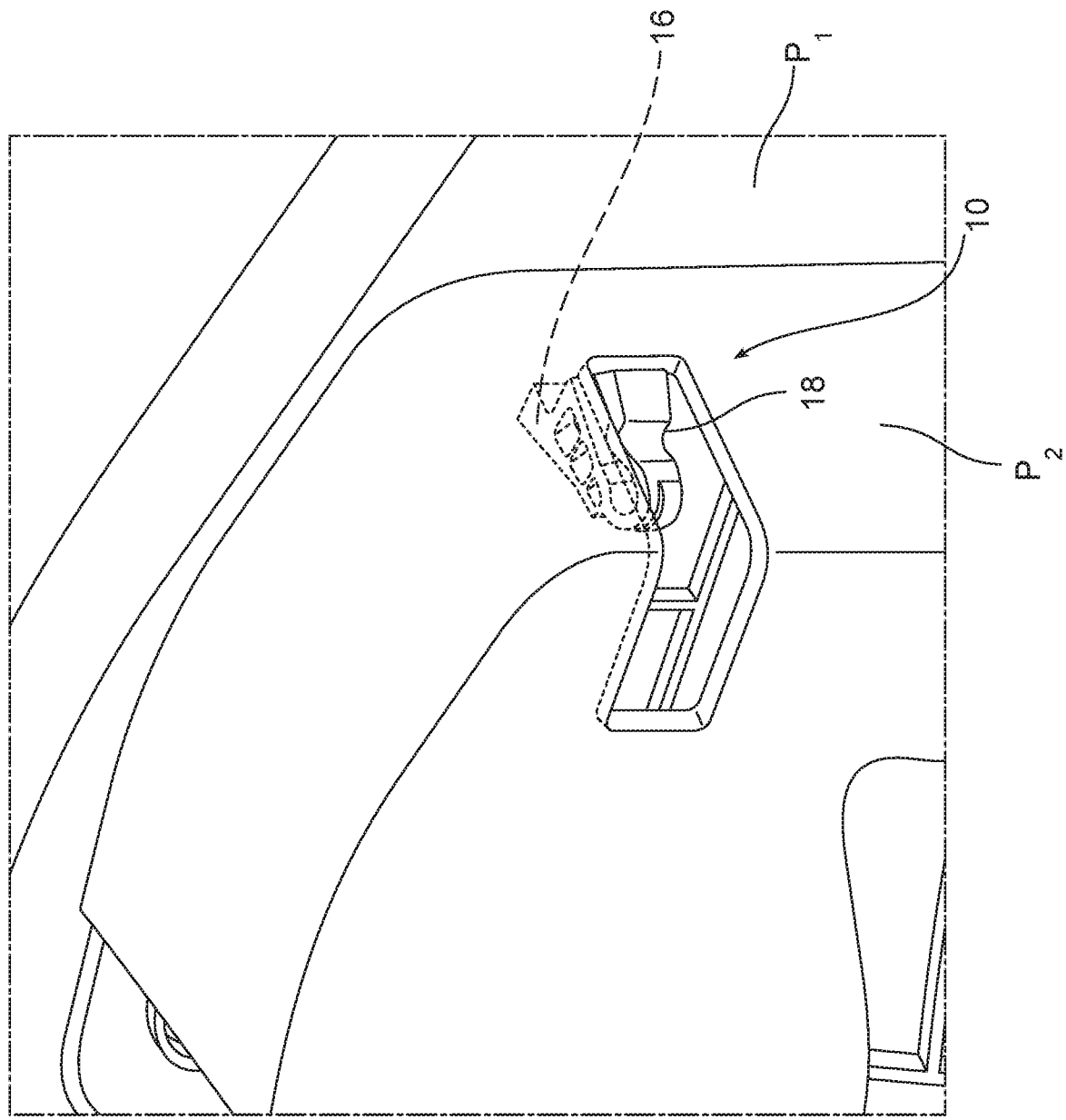
FIG. 2 is a schematic illustration of the spring clip may be integrally molded as a part of a plastic workpiece that is connected to a sheet metal component.

FIG. 2 illustrates how the spring clip 10 may be utilized to secure a plastic component part $P_1$ to, for example, a sheet metal component part $P_2$. In particular, note how the guide ribs 26 at one side of the post 16 and the double blocked notch 32 at the distal end of the single resilient cantilevered leg 18 engage in a mounting aperture A provided in the sheet metal component part $P_2$.

Reference is now made to FIGS. 3*a*-3*c* which illustrate how the spring clip 10 may be utilized to connect the plastic component part $P_1$ to a workpiece and, more particularly, a sheet metal component part $P_2$.

In the embodiment illustrated in FIG. 3*a*, the spring clip 10 is integrally molded as a part of the plastic component part $P_1$. When one wishes to connect the plastic component part $P_1$ to the sheet metal component part $P_2$, one aligns the top of the body 12, where the single resilient cantilevered leg 18 depends from the post 16, with the mounting aperture A in the sheet metal component part $P_2$. That mounting aperture A is substantially rectangular in shape and the rounded nose 42 of the spring clip 10 formed by a portion of the S-curve segment 30 of the single resilient cantilevered leg 18 functions to help align and insert the spring clip 10 into the aperture A.

As the spring clip 10 is inserted into the aperture A, in the sheet metal component part $P_2$ (see FIG. 3*b*), the tapered guide ribs 26 engage the first edge $E_1$ of the aperture A properly orienting the spring clip 10 in the aperture A as the single resilient cantilevered leg 18 is brought into contact with the second edge $E_2$ at the opposite side of the aperture A. As the spring clip 10 is further inserted into the aperture A, the cam surface 44 in engagement with the second edge $E_2$ of the aperture A causes the single resilient cantilevered leg 18 to flex about the first bend 46 and second bend 48 of the S-curve segment 30 and pivot inwardly toward the support post 16 (note action arrow A).

Once the spring clip 10 is fully seated in the sheet metal component part $P_2$, the single resilient cantilevered leg 18 springs outwardly away from the support post 16 about the first and second bends 46, 48 with the margin of the sheet metal component part $P_2$ forming a second edge $E_2$ fully received and seated in the double block notch 32 at the midpoint angle 38. See FIG. 3*c*.

Should it ever become necessary to disconnect the plastic component part $P_1$ from the sheet metal component part $P_2$ for service or any other reason, it is possible to pry the plastic component part away from the sheet metal component part and overcome the resilient holding power of the spring clip 10. When this is done, the second edge $E_2$ of the aperture A slides up the radiused face 40 of the double block notch 32 causing the single residual cantilevered leg 18 to bend slightly inward toward the support post 16 until the edge $E_2$ is free of the double block notch 32 at which point the two parts may be separated easily. Advantageously, the radiused face 40 relieves stress on the single resilient cantilevered leg 18 during removal from the mounting aperture A in the sheet metal component part $P_2$.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A spring clip, comprising:
   a base;
   a post carried on said base; and
   a single resilient cantilevered leg depending from said post wherein opposite said single resilient cantilevered leg said post includes two tapered guide ribs defining an intervening channel wherein each tapered guide rib of said two tapered guide ribs has a first width $W_1$ at a first end and a second width $W_2$ at a second end wherein $W_1 > W_2$, wherein said first end engages said base and wherein said single resilient cantilevered leg includes an S-curve segment and a distal end having a double blocked notch.

2. The spring clip of claim 1, wherein said double blocked notch includes a midpoint angle and a radiused face.

3. The spring clip of claim 2, wherein said double blocked notch is substantially V-shaped.

4. The spring clip of claim 3, wherein said post includes an undercut.

5. The spring clip of claim 4, wherein said post includes at least one aperture extending through said post.

6. The spring clip of claim 5, wherein said S-curve segment has one end connected to said post and another end connected to said double blocked notch.

7. The spring clip of claim 1, wherein said post includes an undercut.

8. A spring clip, comprising:
a base;
a post carried on said base; and
a single resilient cantilevered leg depending from said post wherein opposite said single resilient cantilevered leg said post includes two guide ribs defining an intervening channel and wherein said single resilient cantilevered leg includes an S-curve segment and a distal end having a double blocked notch.

9. The spring clip of claim 8, wherein said double blocked notch includes a midpoint angle and a radiused face.

10. The spring clip of claim 9, wherein said double blocked notch is substantially V-shaped.

11. The spring clip of claim 10, wherein said S-curve segment has a first end connected to said post and a second end connected to said double blocked notch.

12. A spring clip, comprising:
a base;
a post carried on said base;
a single resilient cantilevered leg depending from said post; and
at least one guide rib carried on said post opposite said single resilient cantilevered leg
wherein (a) said at least one guide rib is tapered and has a first width $W_1$ at a first end and a second width $W_2$ at a second end wherein $W_1 > W_2$ and said first end engages said base, (b) said single resilient cantilevered leg includes an S-curve segment and a distal end having a double blocked notch that is substantially V-shaped and includes a midpoint angle and a radiused face and (c) said post includes an undercut and at least one aperture extending through said post.

* * * * *